United States Patent
Srinivasan et al.

(10) Patent No.: US 11,192,805 B2
(45) Date of Patent: Dec. 7, 2021

(54) SYNERGISTIC CHEMICAL OXIDATIVE AND PHOTOCATALYTIC ENHANCER SYSTEM (SCOPES) FOR WASTEWATER REMEDIATION

(71) Applicant: Florida Polytechnic University Board of Trustees, Lakeland, FL (US)

(72) Inventors: Sesha S. Srinivasan, Lakeland, FL (US); Scott L. Wallen, Tampa, FL (US); Jephté Douyon, Lakeland, FL (US)

(73) Assignee: Florida Polytechnic University Board of Trustees, Lakeland, FL (US)

( * ) Notice: Subject to any disclaimer, the term of this patent is extended or adjusted under 35 U.S.C. 154(b) by 229 days.

(21) Appl. No.: 16/425,590

(22) Filed: May 29, 2019

(65) Prior Publication Data
US 2019/0367384 A1  Dec. 5, 2019

Related U.S. Application Data

(60) Provisional application No. 62/677,245, filed on May 29, 2018.

(51) Int. Cl.
*C02F 1/32* (2006.01)
*C02F 1/72* (2006.01)
(Continued)

(52) U.S. Cl.
CPC ............... *C02F 1/32* (2013.01); *C02F 1/722* (2013.01); *C02F 1/725* (2013.01);
(Continued)

(58) Field of Classification Search
CPC .. C02F 1/32; C02F 1/725; C02F 1/722; C02F 2209/08; C02F 2101/308; C02F 2103/06; C02F 2305/10; Y02W 10/37
See application file for complete search history.

(56) References Cited

U.S. PATENT DOCUMENTS 7,348,288 B1 * 3/2008 Kittrell .............. B01D 53/8662
502/102
8,328,917 B2   12/2012 Garfield et al.
(Continued)

FOREIGN PATENT DOCUMENTS

| CA | 2331630 C | 7/2007 |
| CN | 106955708 A | 7/2017 |
| WO | 2014059033 A1 | 4/2014 |

OTHER PUBLICATIONS

Trojanowicz, Mark, et.al; Advanced Oxidation/Reduction Processed treatment for aqueous PFOA and PFOS a review, Chemical Engineering Journal, 333 (2018) 170-199, available online Nov. 2017 (Year: 2018).*

(Continued)

*Primary Examiner* — Bradley R Spies
*Assistant Examiner* — Jeannie McDermott
(74) *Attorney, Agent, or Firm* — Smith & Hopen, P.A.; Paul Murty

(57) ABSTRACT

Leachate remediation is performed by synergistic chemical oxidation and photocatalytic-oxidation enhancer system (SCOPES) of municipal landfill leachate to a level that is safe for disposal within regulatory guidelines. The physicochemical (chemical, spectroscopic, elemental, microstructural and thermal) characteristics of the pre- and post-treated landfill leachate have been investigated to examine the utility of advanced oxidation (AO) processes such as SCOPES to decontaminate the municipal landfill leachate and/or toxic organic wastewater. The experimental results demonstrated successful lowering of chemical oxygen demand (COD) and UV-Vis absorbance for constituent contaminants in the leachate and/or wastewater solutions.

14 Claims, 16 Drawing Sheets
(2 of 16 Drawing Sheet(s) Filed in Color)

(51) Int. Cl.
*C02F 101/30* (2006.01)
*C02F 103/06* (2006.01)

(52) U.S. Cl.
CPC .... *C02F 2101/308* (2013.01); *C02F 2103/06* (2013.01); *C02F 2209/08* (2013.01); *C02F 2305/10* (2013.01)

(56) References Cited

U.S. PATENT DOCUMENTS

| | | | |
|---|---|---|---|
| 10,259,730 | B2 | 4/2019 | Ball et al. |
| 2014/0110344 | A1 | 4/2014 | Hoag et al. |
| 2016/0367968 | A1* | 12/2016 | Guerrero ............... B01J 27/24 |
| 2019/0218127 | A1* | 7/2019 | Wood ..................... C02F 1/008 |
| 2019/0336937 | A1* | 11/2019 | Clark ................... B01J 20/3007 |

OTHER PUBLICATIONS

Hilles AH, et.al; Performance of combined sodium persulfate/H2O2 based advanced oxidation process in stabilized landfill leachate treatment. J Environ Manage. Jan. 15, 2016;166:493-8. doi: 10.1016/j.jenvman.2015.10.051. Epub Nov. 12, 2015. PMID: 26580899. (Year: 2015).*

Asahi, et al. (2001). Visible-light photocatalysis in nitrogen-doped titanium oxides. Science, 293(5528), 269-271.

Ullah, et al. (2015). Enhanced photocatalytic properties of core@shell SiO2@TiO2 nanoparticles Applied Catalysis B: Environmental, 179, 333-343.

Deng, et al. (2015). Advanced oxidation processes (AOPs) in wastewater treatment. Current Pollution Reports, 1(3), 167-176.

Fujishima, et al. (1972). Electrochemical photolysis of water at a semiconductor electrode. Nature, 238(5358), 37-38.

Gao, et al. (2015). Integration of autotrophic nitrogen removal, ozonation and activated carbon filtration for treatment of landfill leachate. Chemical Engineering Journal, 275, 281-287.

Zrinyi, N. (2017). Factors affecting contaminant transformation by heat-activated persulfate (Doctoral dissertation, Carleton University Ottawa).

Hilles, et al. (2016). Performance of combined sodium persulfate/H2O2 based advanced oxidation process in stabilized landfill leachate treatment. Journal of Environmental Management, 166, 493-498.

Huang, et al. (1993). Advanced chemical oxidation: its present role and potential future in hazardous waste treatment. Waste Management, 13(5-7), 361-377.

Khan, et al. (2002). Efficient photochemical water splitting by a chemically modified n-TiO2. Science, 297(5590), 2243-2245.

Meeroff, et al. (2014). Safe Discharge of Landfill Leachate to the Environment. Final Report for the William W. "Bill" Hinkley Center for Solid and Hazardous Waste Management, Gainesville, FL. Report.

Pajonk, G. M. (1991). Aerogel catalysts. Applied Catalysis, 72(2), 217-266.

Qi, et al. (2012). Characterization of humic substances in bio-treated municipal solid waste landfill leachate. Frontiers of Environmental Science & Engineering, 6(5), 711-716.

* cited by examiner

Fig. 1—PRIOR ART

SYNERGISTIC CHEMICAL OXIDATIVE AND PHOTOCATALYTIC ENHANCER SYSTEM (SCOPES) FOR WASTEWATER REMEDIATION

CROSS-REFERENCE TO RELATED APPLICATIONS

This nonprovisional application is a continuation of and claims priority to provisional application No. 62/677,245, entitled "Synergistic chemical oxidative and photocatalytic enhancer system (SCOPES) for wastewater remediation," filed on May 29, 2018, by the same inventors.

BACKGROUND OF THE INVENTION

1. Field of the Invention

This invention relates, generally, to wastewater remediation. More specifically, it relates to remediation of landfill leachate.

2. Brief Description of the Prior Art

Modern society relies on landfills as a necessary mechanism for waste disposal. Although traditional disposal of waste in landfills has been practiced for centuries, it still does not qualify as a sustainable process. Throughout a landfill's lifetime and beyond its' closure, leachate-resulting from precipitation drainage, liquid waste, and other moisture that exists in the waste composition (e.g., water percolated through the waste)—must be continually removed. Leachate is a complex matrix of different chemicals with different concentrations. As such, if leachate were directly discharged into the environment it could have catastrophic effects on both the water and soil due to groundwater contamination. Therefore, this waste, as with any industrial wastewater, must be treated to meet EPA and State Water Quality Standards [1].

Municipalities and other stakeholders are currently addressing this issue within the scope of sustainable landfill management practices leading to an increased understanding of the challenges with legally, economically and efficiently treating the liquid effluents and solids. Additionally, there are concerns for the potential contamination of surface and ground waters [2]. There are additional pressures for sustainable maintenance beyond closure, and even beyond the 30-year minimum EPA post-closure maintenance, there could be additional liabilities with respect to leachate [3]. All of this suggests that landfill leachate will challenge landfill managers for years to come.

Currently, throughout the United States and particularly in Florida, leachate is routinely sent to publicly owned treatment works (POTWs) for remediation prior to discharge [4]. On-site pre-treatment is anticipated to be critical as POTWs water quality requirements become more stringent. While a large percentage of landfill leachate is treated by bioreactor processing and the process is quite good at removing inorganic and biodegradable organic nitrogen, however, non-biodegradable organic nitrogen persists [5]. The total nitrogen is given in Equation (1) as

$$TN = ON + NH_3 + NO_3^- + NO_2^- \quad (1)$$

where ON is organic nitrogen, $NH_3$ is ammonia nitrogen, $NO_3^-$ and $NO_2^-$ are nitrate nitrogen and nitrite nitrogen, respectively. The sum of the first two terms ($ON+NH_3$) on the right side of equation (1) represents the total Kjeldhal nitrogen while the sum of the last three terms on the right side are the total inorganic nitrogen. It is important to note that the ON is the sum of the recalcitrant organic nitrogen (rON) and the biological organic nitrogen (bON).

Younger landfills generally have a higher level of biodegradable organics, while aging causes organic compounds to be of higher molecular weight and not biodegradable [6]. It is this complexity and the variability of the composition that challenges the engineering of an economical, sustainable process that can adapt to the leachate feed stream characteristics without a change in performance. This is not possible with current technologies.

Leachate organic matter (LOM) is primarily composed of three components that contain significant nitrogen. The first larger molecular weight species are the humic acid (HA) substances which dominate bio-based leachate treatment; the second are the hydrophilic components (HY); and the third are the fulvic acid (FA) components with the nitrogen content of each decreasing in the order listed. An examination of the ultraviolet-visible (UV-Vis) spectra of the HA and FA components that make up the LOM are shown in FIG. 1. One can readily see why these species would interfere with POTWs UV treatment (254 nm). It should be noted that even leachate entering POTW's that rely on chlorine disinfection leachate pre-treatment may be necessary. This is due to the changing stringency that POTW's will place on incoming effluent with respect to nitrogen (both organic and inorganic), phosphorous and Chemical Oxygen Demand (COD) as well as other water quality parameters. This has potential impact for any landfill leachate generated at any landfill site.

Pretreating landfill leachate with advanced oxidation (AO) techniques including titanium dioxide ($TiO_2$)-based photocatalysis has been successfully applied by Meeroff and coworkers [8]. In these studies, preliminary costs and estimates are amenable to treatment on-site [8]. $TiO_2$ is widely used in many photocatalytic [9] and water-splitting [10] applications because of its high stability, low cost, nontoxicity, high oxidation potential and chemically favorable properties. However, most of the electron-hole pairs generated by photolysis are converted to heat rather than active for producing species important for remediation. An increase in production of reactive species would increase efficiency. However, $TiO_2$ can only utilize the UV portion of the solar spectrum (less than 4% of the total sunlight energy), which results in low total efficiency of such catalyst in the utilization of sunlight energy. Any improvements in photocatalytic efficiency of $TiO_2$ or development of other novel photocatalysts with shifts of their activity to the visible portion of the spectrum will have a significant impact on AO to provide dischargeable water from leachate.

Recent research by Hilles and coworkers [11] have shown that AO with the chemicals sodium persulfate and hydrogen peroxide can stabilize landfill leachate and reduce COD. Persulfate ion has been successfully used for in situ ground water and soil decontamination of organics such as per- and polyfluorinated alkane systems [12]. In this process developed by Oxytec, LLC, several combinations of oxidants are used with the exception of $TiO_2$ and photocatalytic activation [12]. The widespread use is attributed to its ability to be activated into a stronger oxidant. Common water remediation oxidants include hydrogen peroxide, permanganate, ozone, and persulfate. The widespread use of permanganate in combination with peroxide has decreased over the past decade with persulfate ($S_2O_8^{2-}$) now the preferred oxidant system [13]. Persulfate is a strong oxidizer with an electron potential of 2.6V. It is highly soluble in water (>40% by weight at 25° C.). Persulfate is quite stable and with activation (e.g., by $H_2O_2$ or heat) is readily broken down into potent $SO_4^{2-}$ and OH-radicals.

However, none of the foregoing research provides the proper combination of advanced chemical oxidation and photocatalysis for effective remediation of landfill leachate. Accordingly, what is needed is an improved leachate remediation mechanism and methodology to render the leachate non-hazardous. However, in view of the art considered as a whole at the time the present invention was made, it was not obvious to those of ordinary skill in the field of this invention how the shortcomings of the prior art could be overcome.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions: or is known to be relevant to an attempt to solve any problem with which this specification is concerned.

BRIEF SUMMARY OF THE INVENTION

The long-standing but heretofore unfulfilled need for a method of effectively remediating leachate and wastewater (contaminated with toxic organic compounds, such as methyl orange) is now met by a new, useful, and nonobvious invention.

The novel method of remediating leachate includes steps of providing an amount leachate, such as a concentration of leachate that is diluted from 14%, or a 100% concentration, and intermixing an amount of a photocatalyst (or modified photocatalyst) with the leachate to form a leachate solution. The photocatalyst may be titanium dioxide or modified titanium dioxide. The leachate solution is subjected to an UV-Vis light source (or, alternatively, solar light or natural light) to form a photocatalyzed leachate solution. The UV-Vis light source may be disposed within a batch reactor, and the leachate solution may be subjected to the light source for approximately three to seven hours. The method also includes a step of intermixing an amount of a chemical oxidant, such as a mixture of sodium persulfate and hydrogen peroxide, to the photocatalyzed leachate solution. In an embodiment, the step of intermixing the amount of the chemical oxidant is performed after the step of intermixing the amount of a photocatalyst with the leachate solution. The method includes a step of heating the chemical oxidant and the photocatalyzed leachate solution to remediate the photocatalyzed leachate solution. The heating step can include heating the chemical oxidant and the photocatalyzed leachate solution to a temperature of 65° C. for a period of two hours or twenty-four hours. Alternatively, the heating step can include heating the chemical oxidant and the photocatalyzed leachate solution to a temperature of 90° C. for a period of two hours or twenty-four hours.

Also provided is a method of verifying a degree of leachate remediation by measuring a first chemical oxygen demand of the leachate solution, measuring a second chemical oxygen demand of the chemical oxidant and the photocatalyzed leachate solution, and comparing the second chemical oxygen demand to the first chemical oxygen demand, wherein the second chemical oxygen demand being lower than the first chemical oxygen demand indicates leachate remediation. The verification method may include a step of intermixing an amount of an organic contaminant, such as methyl orange, to the leachate solution prior to measuring the first chemical oxygen demand. Similarly, the second chemical oxygen demand being lower than the first chemical oxygen demand indicates removal of the organic contaminant, such as methyl orange.

An object of the invention is to provide leachate that is efficiently-treated to be free of organic contaminants, thereby diminishing the hazardous effects of leachate on the environment.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a fuller understanding of the invention, reference should be made to the following detailed description, taken in connection with the accompanying drawings, in which.

DETAILED DESCRIPTION OF THE PREFERRED EMBODIMENT

Figure 1:
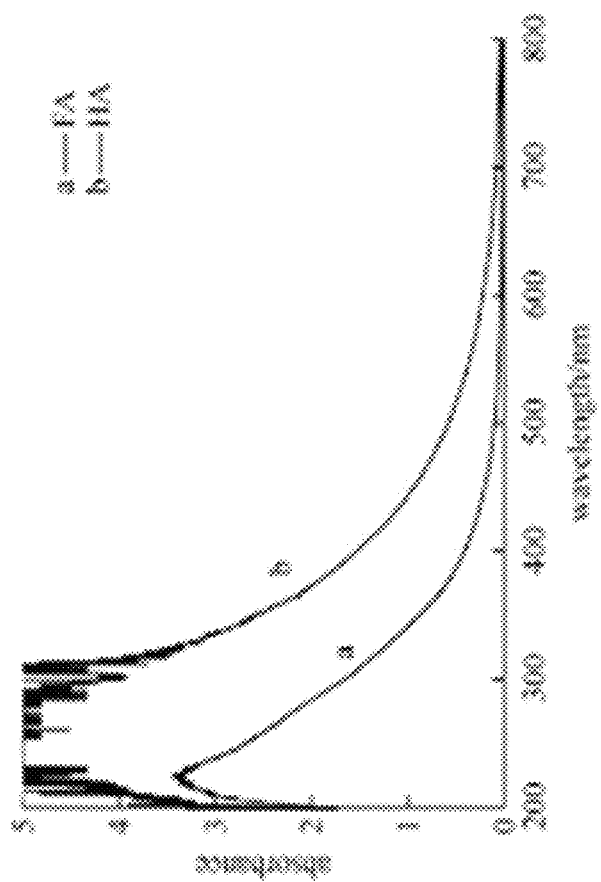
FIG. 1 depicts the UV-Vis absorbance spectra of (a) fulvic acid and (b) humic acid components [7].

In the following detailed description of the preferred embodiments, reference is made to the accompanying drawings, which form a part thereof, and within which are shown by way of illustration specific embodiments by which the invention may be practiced.

It is to be understood that other embodiments may be utilized and structural changes may be made without departing from the scope of the invention.

As used in this specification and the appended claims, the singular forms "a", "an", and "the" include plural referents unless the context clearly dictates otherwise. As used in this specification and the appended claims, the term "or" is generally employed in its sense including "and/or" unless the context clearly dictates otherwise.

As used herein, "about" means approximately or nearly and in the context of a numerical value or range set forth means±15% of the numerical. In an embodiment, the term "about" can include traditional rounding according to significant figures of the numerical value. In addition, the phrase "about 'x' to 'y'" includes "about 'x' to about 'y'".

As used herein, "treat", "treatment", "treating", and the like refer to acting upon a condition (e.g., leachate presence) with an agent (e.g., $TiO_2$ photocatalyst, modified $TiO_2$ photocatalyst, sodium persulfate and hydrogen peroxide) to affect the condition by improving or altering it. The aforementioned terms cover one or more treatments of a condition in a sample of wastewater or leachate, and includes: (a) impeding the development of the condition, and/or (b) relieving the condition, e.g., causing regression of the condition and/or relieving one or more condition symptoms (e.g., presence of a particular toxic compound).

The term "effective amount" as used herein describes concentrations or amounts of components such as agents which are effective for producing an intended result, including leachate remediation. Compositions and/or methodologies according to the present invention may be used to effect a favorable change in leachate toxicity, whether that change is an improvement, relieving to some extent one or more of the symptoms of the condition being treated, and/or that amount that will prevent, to some extent, one or more of the symptoms of the condition that the sample being treated has or is at risk of developing, or a complete remediation of the leachate sample treated.

In certain embodiments, the current invention is an advanced oxidation-based remediation method that effectively combines photocatalysis and chemical oxidation.

It is an object of the current invention to reduce COD and total nitrogen (TN), but in particular, biodegradable organic nitrogen (bON) and recalcitrant organic nitrogen (rON), in landfill leachate. These species have impacts for landfill maintenance and the continued ability to utilize the commonly practiced leachate treatment by publicly owned treatment works (POTWs). Ammonia-nitrogen ($NH_3$—N) and humic substances represent the greatest nitrogen burden.

In certain embodiments, the current invention includes a Synergistic Chemical Oxidative and Photocatalytic Enhancer System (SCOPES)—an economical, efficient and sustainable treatment for a wide range of organic chemical and microbiological contaminants. The following examples characterize the leachate organic matter (LOM) over an extended period with variations in environmental conditions, including rainfall. Remediation examples with complete analytical characterization demonstrate the difference between conventional remediation techniques and the current SCOPES with respect to advanced chemical/photocatalytic oxidation of LOM components. The SCOPES approaches improve efficiency while reducing cost compared to competing technologies (e.g., reverse osmosis, algae-based membrane bioreactors and treatment by photolysis or chemical oxidation alone).

Figure 2:
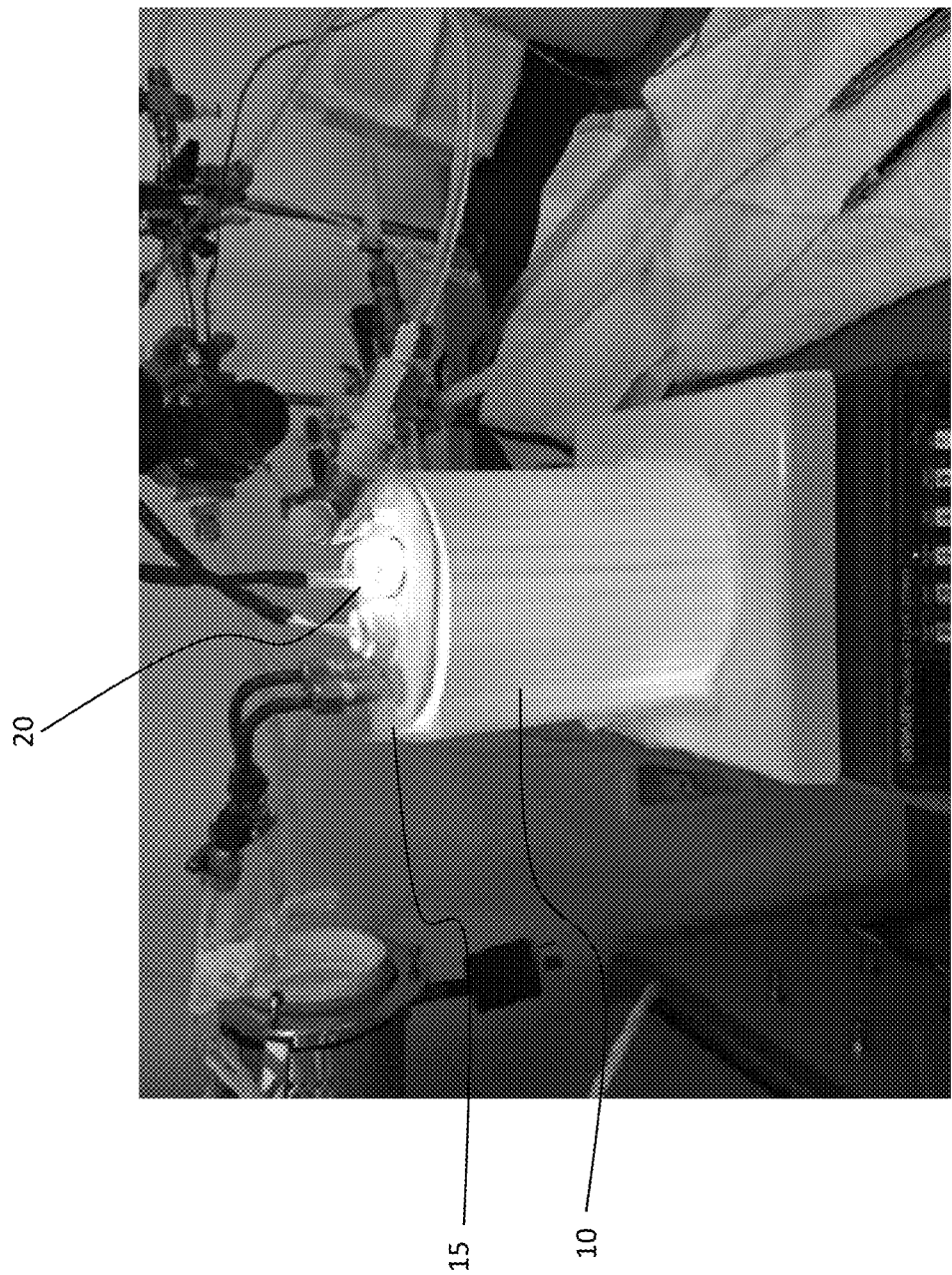
FIG. 2 depicts a SCOPES batch reactor (BR) for the wastewater and/or leachate remediation.
Figure 3A:
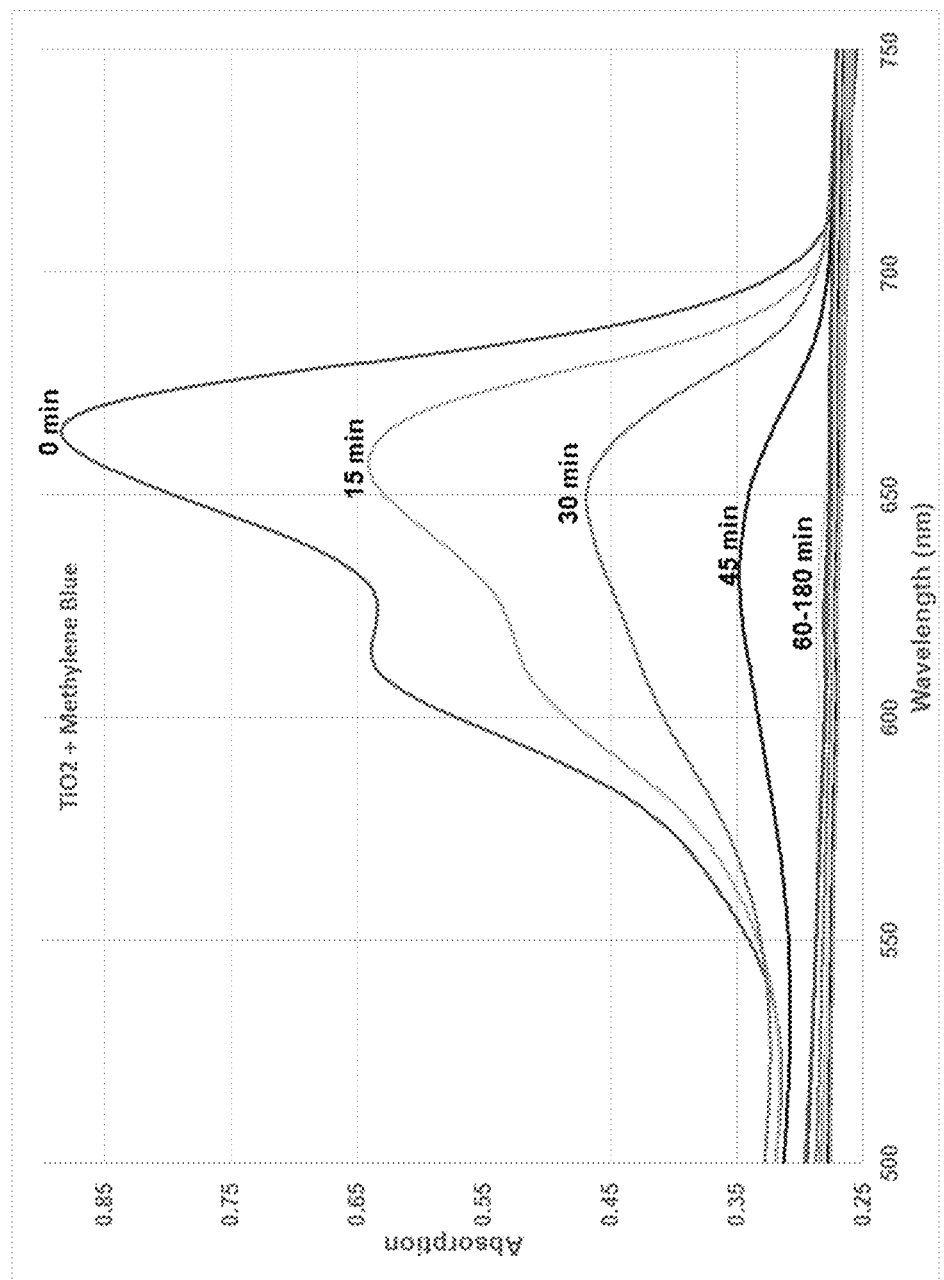
FIG. 3A depicts UV-visible spectra of SCOPES-treated Methylene Blue Dye.
Figure 3B:
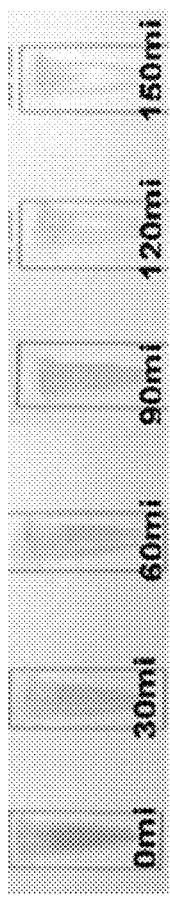
FIG. 3B depicts SCOPES-treated Methylene Blue Dye after 0, 30, 60, 90, 120 and 150 minutes.

SCOPES is a synergistic combination of advanced chemical oxidation and photocatalysis. Efficiency enhancement makes the SCOPES approach an important component of treating landfill leachate prior to dispensation to POTWs or reuse. The SCOPES technology has been successfully tested in treating industrial wastewater effluent contaminants, such as phenol, chloro-phenol, azo-dyes (e.g. methyl orange, methylene blue, etc.) and other toxic organics. The SCOPES batch reactor 10 of 500 ml volume and light sources 20 is shown in FIG. 2 (BR-UV-Vis light, 150 W*4=600 W, 500 ml, water cooling for the UV-Vis light, compressed air for photo-oxidation, sampling done via syringe in the sample port and stored in cuvettes for UV-Vis spectroscopic analysis). The reactor 10 was fabricated using 3D printing technologies (for a housing enclosure of batch reactor 10) and a laser cutter (for a custom-made lid 15), and uses 2 to 4, 150 W halogen light sources 20 housed in PYREX* tubes with water cooling. Preliminary investigations to test the reactor system demonstrated successful decontamination of a toxic organic (FIGS. 3A-3B). For example, using surface modified $TiO_2$ photocatalyst and UV-Vis light irradiation, 20 ppm of azo-dye, methylene blue (MB) in DI water undergoes complete degradation within 1-3 hours.

In recent years, many papers have been published on the enhancement of visible light photocatalysis of $TiO_2$ by (i) anion doping [14, 15], (ii) nanoparticulate coupling [16, 17], (iii) $TiO_2$ nanoshells on $SiO_2$ core [18] and (iv) band-gap tailoring of $TiO_2$ by co-doping [19]. The current approach extends the solar light harvesting capacity of the catalysts from 4% (conventional catalysts) to >20% (modified catalysts). This is expected to significantly reduce both capital and operating costs in landfill leachate and other wastewater remediation applications.

In certain embodiments, the photocatalyst utilized may be modified $TiO_2$ to move the UV-Vis absorption spectrum as desired.

In certain embodiments, the modified $TiO_2$ contains mixed elements or compounds such metal(s) and metal oxides (for example, carbon, nitrogen, silver, copper oxide, iron oxide, zinc iron oxide, etc.) that are added to the $TiO_2$ photocatalyst.

Figure 4:
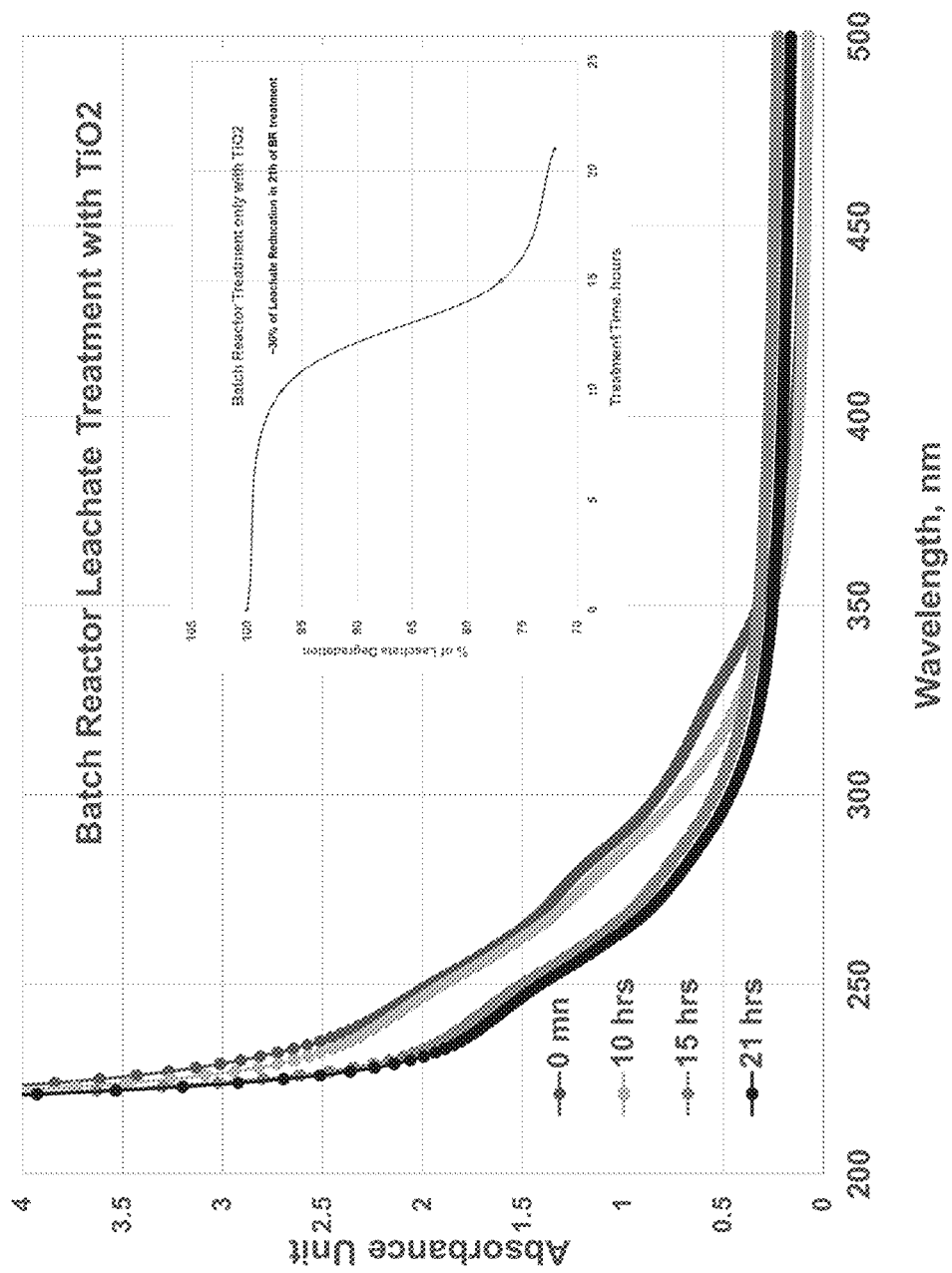
FIG. 4 depicts the UV-Vis absorbance spectra of the leachate samples treated with $TiO_2$ photocatalytic oxidation at 0 min, 10 hours, 15 hours and 21 hours. The inset of FIG. 4 demonstrates 30% degradation of leachate contaminants in 21 hours of treatment.

The photocatalytic system involved weighing 3 grams of $TiO_2$ photocatalyst and thoroughly mixing with 500 mL of a 14% diluted leachate solution. This concentration was chosen to permit the remediation while knowing that the contributing species to the UV-VIS spectrum followed Beer's Law. It can be known then that the changes in absorbance are linearly related to the sum of the concentrations of contaminants as confirmed from linear regression of diluted leachate. Treated leachate samples were drawn from the batch reactor at intervals of 0 h, 10 h, 15 h and 21 h, centrifuged at 10,000 rpm and were analyzed by UV-Vis absorption spectroscopy. FIG. 4 shows the UV-Vis absorbance spectra of the samples, showing decrease of absorbance with increase of time duration in BR Overall there is a 30% decrease in contaminants absorbance after 21 hours treatment with photocatalysts as shown in the inset of FIG. 4. These results show the promise of the $TiO_2$ photocatalyst system.

Figure 5:
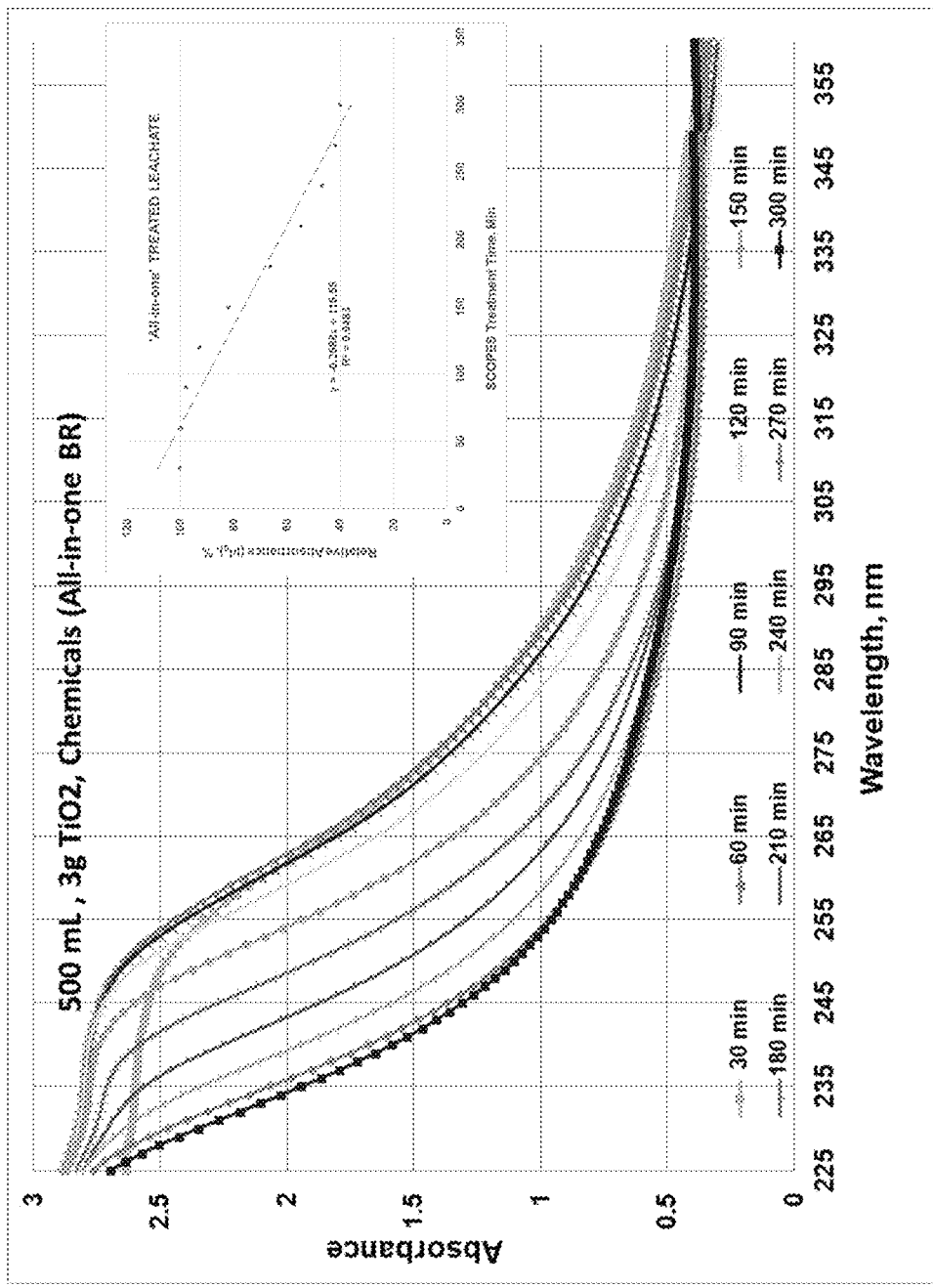
FIG. 5 depicts effects of treatment of the leachate by the SCOPES (All-in-One) technique with sodium persulfate and hydrogen peroxide (Xg/xg) added to the leachate-$TiO_2$.

The treatment of the leachate by the SCOPES technique with sodium persulfate and hydrogen peroxide (Xg/xg) added to the leachate-$TiO_2$, at room temperature, directly showed the power of the synergistic combination of the AO techniques as given in FIG. 5. Here, the leachate system contaminant absorbance has been reduced by 60% as shown in the inset of FIG. 5. Also see Table 1.

TABLE 1

SCOPES methods such as All-in-One and Sequential processes for leachate remediation

| T3-Batch Reactor + Chemicals Experiments | All-in-one Diluted Leachate | With Chemicals Without Chemicals | Average T = 29° C. | 0 min- 300 min | Diluted + Chemicals pH < 1; Neutralization done for pH adjustments | The $TiO_2$ catalyst enhances the UV-Vis absorbance and greater degradation than the sample without $TiO_2$ |
| | SCOPES (Dilutes Leachate) + MO + Hotplate | With Chemicals Heat | Room T ° C. 65° C., 90° C. | 0 min, 2 h, 5 h 2 h, 24 h | | The chemically treated sample heated at 65° C. in 2 hours, has lower and equivalent UV-Vis absorbance of the sample heated for 24 hours |

The pre-treated (raw) and SCOPES-treated leachate were examined by dynamic light scattering (DLS) and Fourier Transform Infrared (FTIR) Spectroscopy. The first technique has the ability to determine hydrodynamic particle diameters and their population distributions. Although the particle diameters determined were inconclusive due to polydispersity, the derived count rates, which are count rates corrected for the attenuator setting that keeps the detector linear, showed marked differences between the untreated and treated leachate. For the untreated and SCOPES-treated leachate samples, the derived count rates were 70.1 kilo counts per second (kcps) and 2.8 kcps, respectively. This result indicates a significant decrease in the overall concentration of particles in the SCOPES-treated leachate system since the overall counts are related to the number of particles scattering the light.

Figure 6:
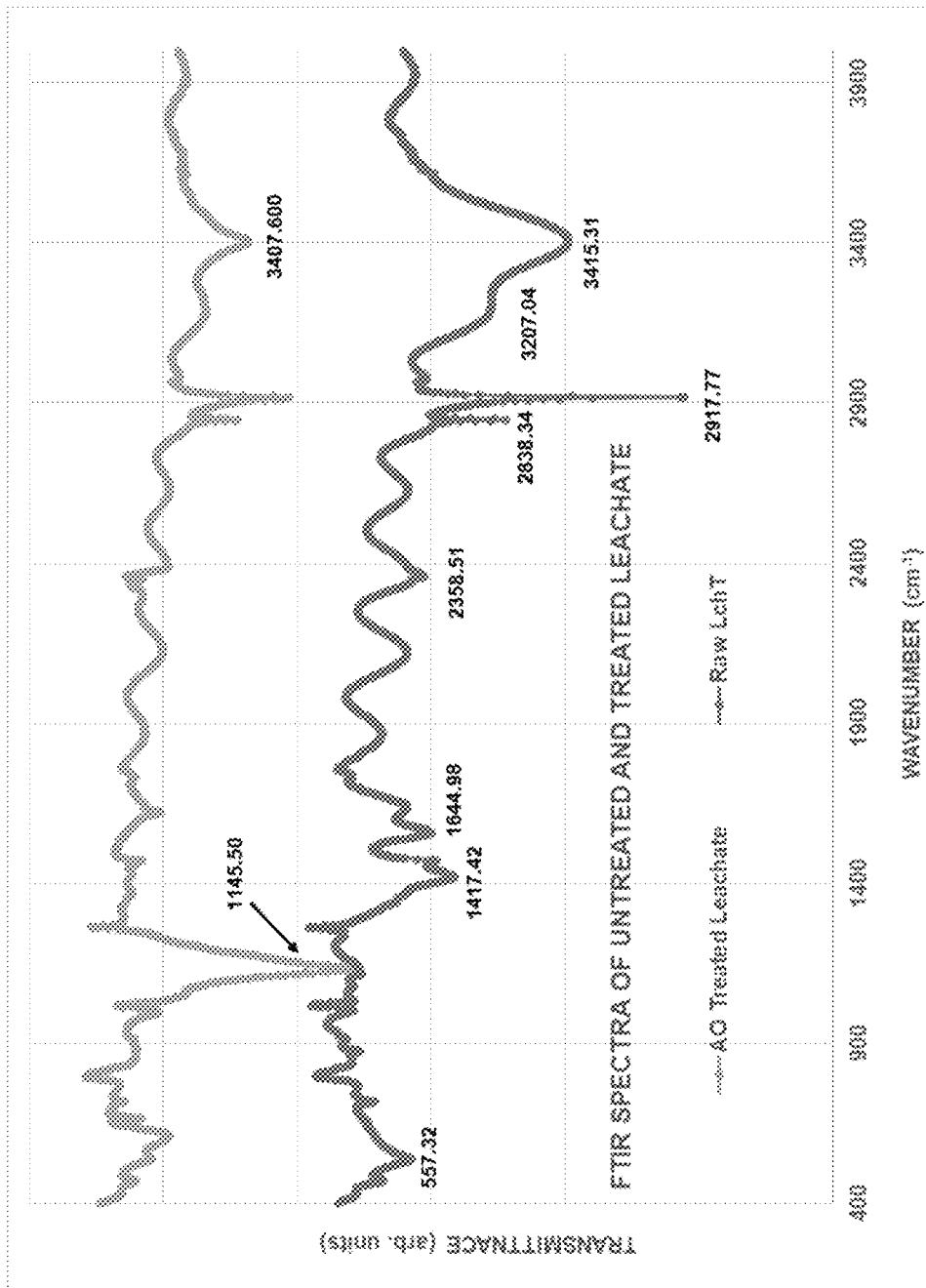
FIG. 6 depicts the Fourier Transform Infrared (FTIR) spectra for the untreated leachate and SCOPES-treated leachate, providing specific chemical changes in the pre- and post-treated leachate.

The FTIR spectra for the untreated leachate and SCOPES-treated leachate were recorded to examine specific chemical changes in the pre- and post-treated leachate. The spectra are given in FIG. 6 with functional group assignments in Table 2.

TABLE 2

FTIR data of atomic vibration assignments, bond stretches and bending modes of raw and SCOPES-treated leachate

| Wavenumber cm$^{-1}$ | Functional Group |
| --- | --- |
| 1145.50 | S—O stretch |
| 1417.42 | COO— stretch |
| 1644.98 | C=O (amide I carboxylate) |
| 2838.34 | C—H stretch (sp$^3$) |
| 2917.77 | C—H stretch (sp$^2$) |
| 3207.04 | NH$_2$ stretch |
| 3407.60 | O—H stretch |
| 3415.31 | O—H stretch |

Each functional group has a different vibration frequency. FTIR is the fingerprint of the molecular vibration frequencies. Leachate is primarily organic matter made of elements such as C. H, N, O, S. One important difference between raw leachate and the treated leachate is that the treated samples showed an additional COO stretch at a wavelength of 1417 cm$^{-1}$ wavenumber. The functional group column represents the chemical environment or bonding stretch, for example the stretch between oxygen and hydrogen or nitrogen and hydrogen.

The raw leachate shows a wide band at 3415 cm$^{-1}$. This is attributable to the O—H stretch of water and shifts to ~3408 cm$^{-1}$ in the treated leachate. The band at 3207 cm$^{-1}$ is attributable to the amide $NH_2$ stretch of primary amides that are present in the humic and fulvic acid portions of the organic matter [20-23]. It is important to point out that the area of this band relative to the O—H stretch is lower in the treated leachate than in the raw leachate indicating an apparent decrease in the organic matter content with the SCOPES treatment. The next two bands at ~2918 cm$^{-1}$ and ~2838 cm$^{-1}$ are attributable to the C—H stretch of sp$^2$ and sp$^3$ carbons, respectively. The band at ~1645 cm$^{-1}$ is attributable to C=O stretch of the amide I carboxylate species in the organic matter.

The band at ~1417 cm$^{-1}$ is attributable to the COO— stretch of carboxylate groups. These bands are decreased in the treated leachate relative to the raw leachate providing further evidence of organic matter remediation. Lastly, the only new band that appears after SCOPES treatment is the band centered at ~1146 cm$^{-1}$ which is attributed to the S—O stretch of inorganic sulfate product resulting from the reaction of the persulfate ion with the leachate. Traces of sulfates are present; however, these are relatively benign and considered non-hazardous.

Although the COD of the raw leachate could not be measured due to its high COD content, recent contractor's measurements at Polk County's (Florida) North Central Landfill Facility showed the COD levels to be ~600 mg/L [Flowers Chemicals]. In experiments performed at Florida Industrial and Phosphate Research Institute (FIPR), a research wing of inventors' institution, COD measurements were run for the standards, potassium hydrogen phthalate (KHP) solutions and SCOPES-treated leachate using potassium dichromate as the oxidant at 150° C. Also see Table 3, which represents the volume concentrations (in ppm) of elements in the raw leachate. No cadmium or other toxic element were present in the sample. The Induction Coupled Plasma-Optical Emission Spectroscopy (ICP-OES) data collected from the raw leachate matches with previous literature values reported by Dr. Maya Trotz, in 2014.

Figure 7:
FIG. 7 is the picture of the dichromate digest of the SCOPES-treated leachate, the raw leachate and two of the standards. The SCOPES-treated leachate has lighter green color when compared to the dark untreated leachate solution.

The results indicated a COD level of 4.5 mg/L for the SCOPES-treated leachate. A picture of the dichromate digest of the SCOPES-treated leachate, the raw leachate, and two of the standards are shown in FIG. 7. This is an order of magnitude lower than the value of the raw leachate and the lowest reported leachate remediation COD value reported to date.

Efficiency increases are expected in SCOPES AO systems involving advanced oxidants (e.g., persulfate, $S_2O_8^{2-}$ and peroxide $H_2O_2$) in combination with $TiO_2$ photocatalyst as enhancer system, presumably, through the generation of a higher density of hydroxyl free radicals (OH.). The present project is focused on utilizing the SCOPES reactor with novel, earth abundant materials solutions to increase the overall remediation efficiency of landfill leachate.

Figure 8B:
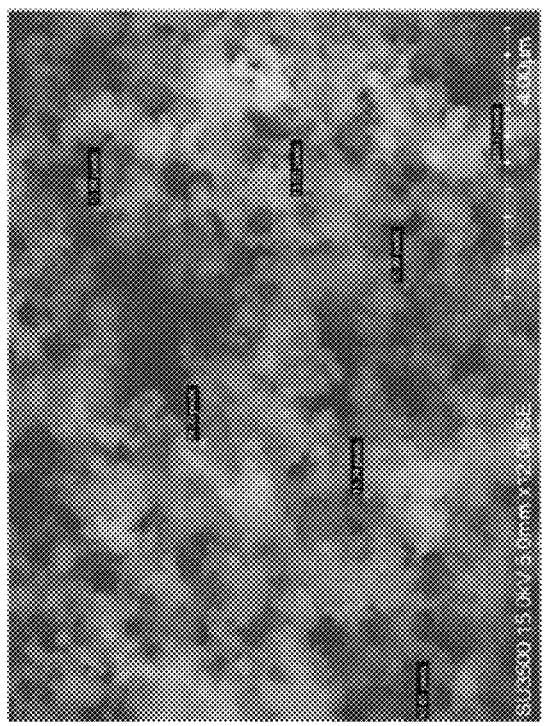
FIG. 8B shows that at higher magnifications (5000×-12000×), the SEM micrographs demonstrated spherical bubble shape images with different color contrast and are linked as organic chains of molecules with an average spherical diameter of 116-120 nm (486 pixels=4 μm or 1 pixel=8 nm).
Figure 8A:
FIG. 8A shows that at lower magnifications (110×), the Scanning Electron Micrographs (SEM) demonstrated fractal growth and branch like microstructure confirms the salt crystallization and growth in leachate samples.

As seen in FIGS. 8A-8B, surface morphology obtained from the SEM for the raw leachate samples confirm the salt (sodium chloride) type fractal crystal growth (tree-branch structure). With higher magnification, the bubble shape or sponge-like structure can be seen with an individual particle size of about 116-120 nm. See also SEM micrograph of FIG. 9A.

Figure 9B:
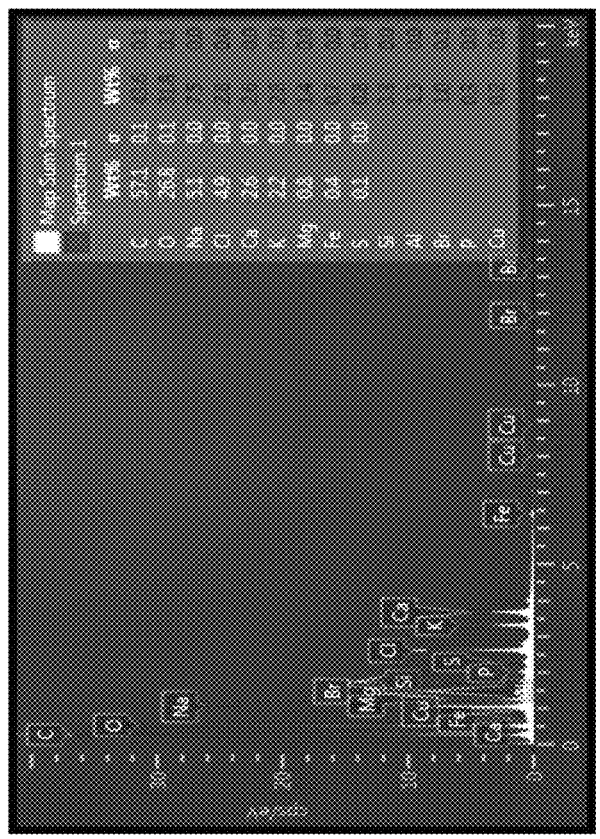
FIG. 9B depicts the EDS summation spectra (with weight percentage of different elements) obtained from the composite SEM micrograph of FIG. 9A.
Figure 9A:
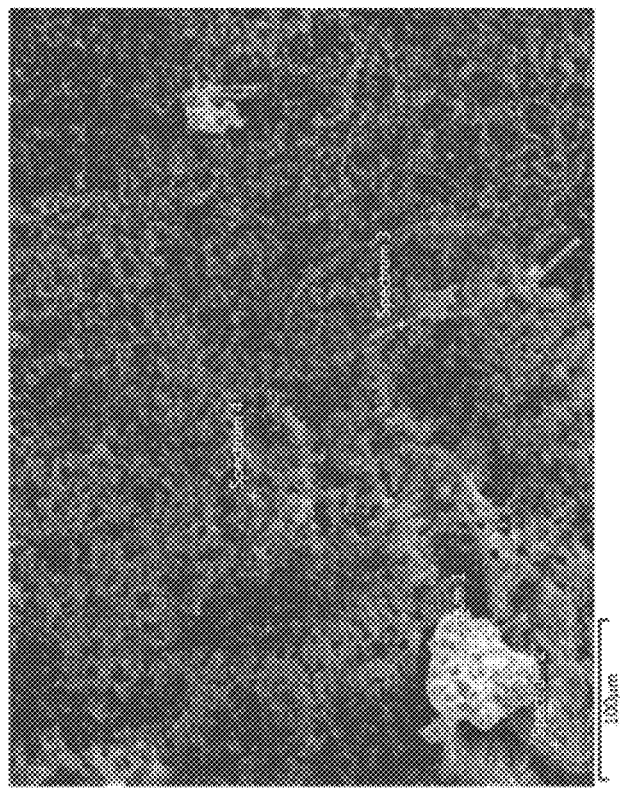
FIG. 9A shows that the composite SEM micrographs where the X-ray spectra gathered by Energy Dispersive Spectroscopic (EDS) Analysis.

As seen in FIG. 9B, the EDS summation spectra obtained from various SEM micrograph regions of the leachate samples showed the presence of various elements, for example, carbon—51 wt %; O—26.8 wt %; Na—5.1 wt %' Cl—4.9 wt %; Ca—2.6 wt %; K—2.2 wt %; Mg—0.8 wt %; Fe—0.4 wt % and S—0.1 wt %.

Figure 10:
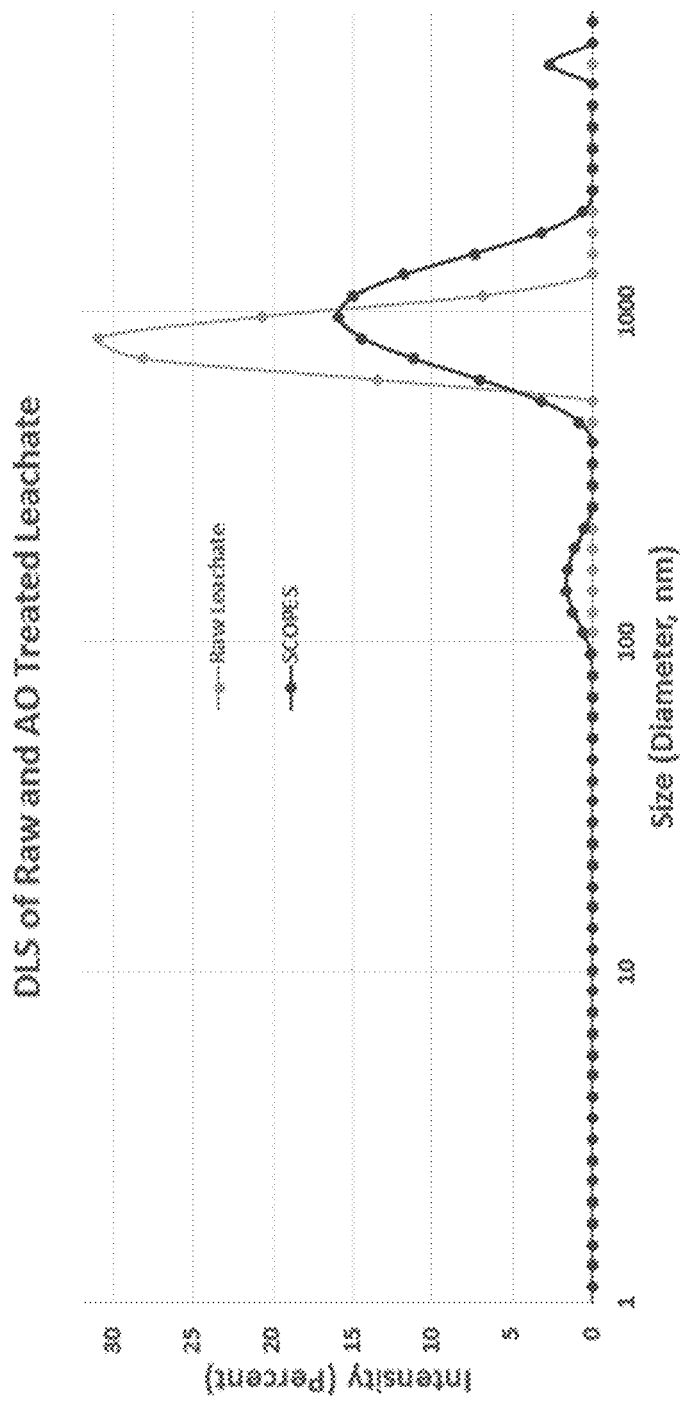
FIG. 10 depicts the Dynamic Light Scattering (DLS) profiles of raw and SCOPES-treated leachate.

As seen in FIG. 10, it is outside the size detection of large particles above 6 microns. There are a lot of large particles that were detected by the size is greater than what can be calculated. The total number of particles is higher in the raw than that in the SCOPES-treated leachate. The derived count rate provides an indication of the number of particles scattered in the absence of attenuator (obstacle stop, an aperture, a hole). The detector receives too much light, so the attenuator is set to 8, limiting the transmission.

Figure 11:
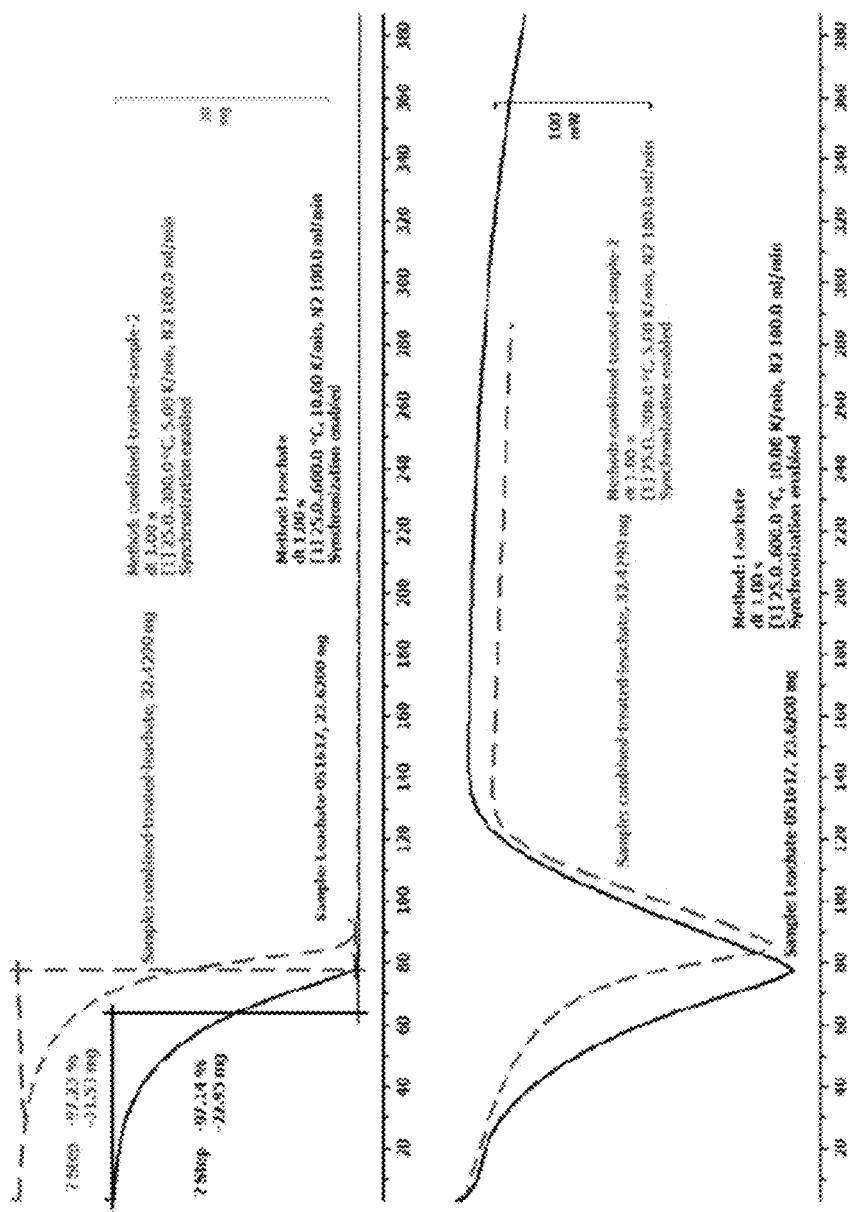
FIG. 11 depicts thermogravimetric (top) and differential scanning calorimetric (bottom) analysis (TGA & DSC) of raw and SCOPES-treated leachate. Higher contaminant weight loss at lower temperature, below 80° C. are obtained for the SCOPES-treated leachate when compared to the untreated one.

As seen in FIG. 11, the TGA of raw leachate shows the decomposition of organic species below 100° C., whereas the treated samples due to the presence of DI water, exhibit the decomposition to little close to 100° C. In both cases, the weight loss or mass loss is about 97-98% with no secondary decomposition step observed. The DSC profiles of those decomposition temperatures showed an endothermic phase transition at the TGA temperature conditions mentioned above. By comparing the DSC profiles, it can be seen that the SCOPES-treated samples required less heat than raw leachate. Additionally, they exhibit higher degradation weight loss in TGA (about 32 mg) when compared to the raw leachate (about 23 mg).

TABLE 3

| | | | | | | | | | |
|---|---|---|---|---|---|---|---|---|---|
| ICP-OES Results of Raw Diluted Leachate | | | | | | | | | |
| Sample May 23, 2017 | | Na (ppm) | Zn (ppm) | Co (ppm) | Cd (ppm) | Cu (ppm) | Cr (ppm) | Ni (ppm) | Fe (ppm) |
| FIPR Samples | Tank 1-1 g | 2205 | 1.06 | 0.01 | 0.00 | 0.27 | 0.09 | 0.09 | 6.18 |
| | Tank 1-2 g | 2434 | 0.40 | 0.03 | 0.00 | 0.22 | 0.12 | 0.14 | 6.65 |
| | Tank 1-5 g | 2411 | 0.45 | 0.04 | 0.00 | 0.23 | 0.13 | 0.14 | 6.11 |
| Florida Poly Samples | Tank 1-1 g | 2333 | 1.06 | 0.00 | 0.00 | 1.95 | 0.14 | 0.12 | 7.35 |
| | Tank 1-2 g | 2630 | 0.72 | 0.02 | 0.00 | 1.11 | 0.14 | 0.11 | 6.97 |

Figure 12A:
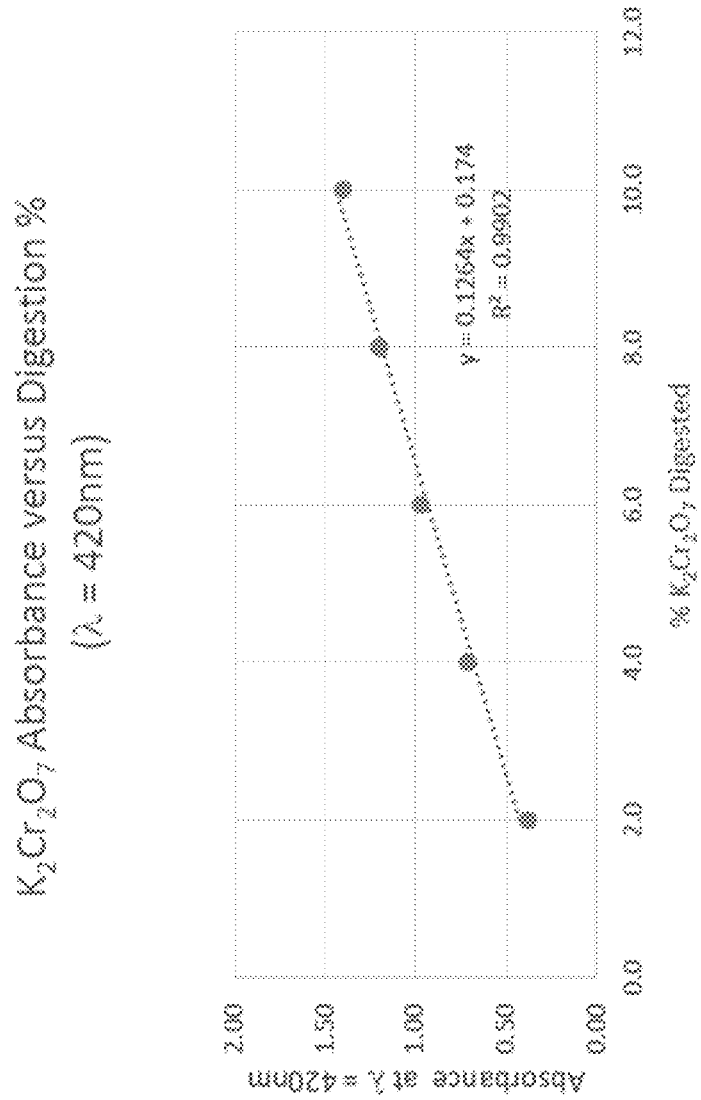
FIG. 12A depicts potassium chromate absorbance versus digestion percentage.
Figure 12B:
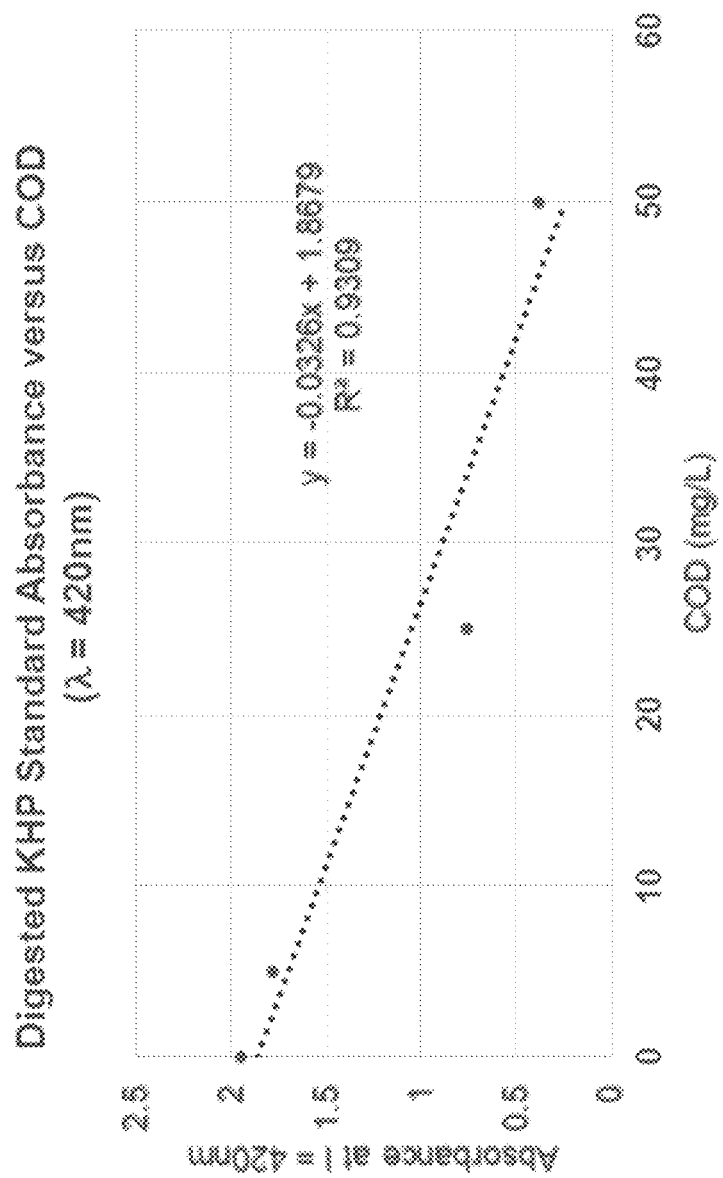
FIG. 12B depicts the digested KHP (potassium hydrogen phthalate) standard absorbance versus COD (n=420 nm). Based on the best fit line of the data points obtained, the COD for the SCOPES-treated leachate is calculated to be 4.5 mg/L. However, the raw leachate has a COD value which is greater than 600 mg/L.

FIGS. 12A-12B show that when potassium hydrogen phthalate standard (which is a COD reference) is at 420 nm, the absorbance of the SCOPES sample was 1.72. The standard curve for COD results in 4.5 mg/L, oxygen equivalents.

Figure 13:
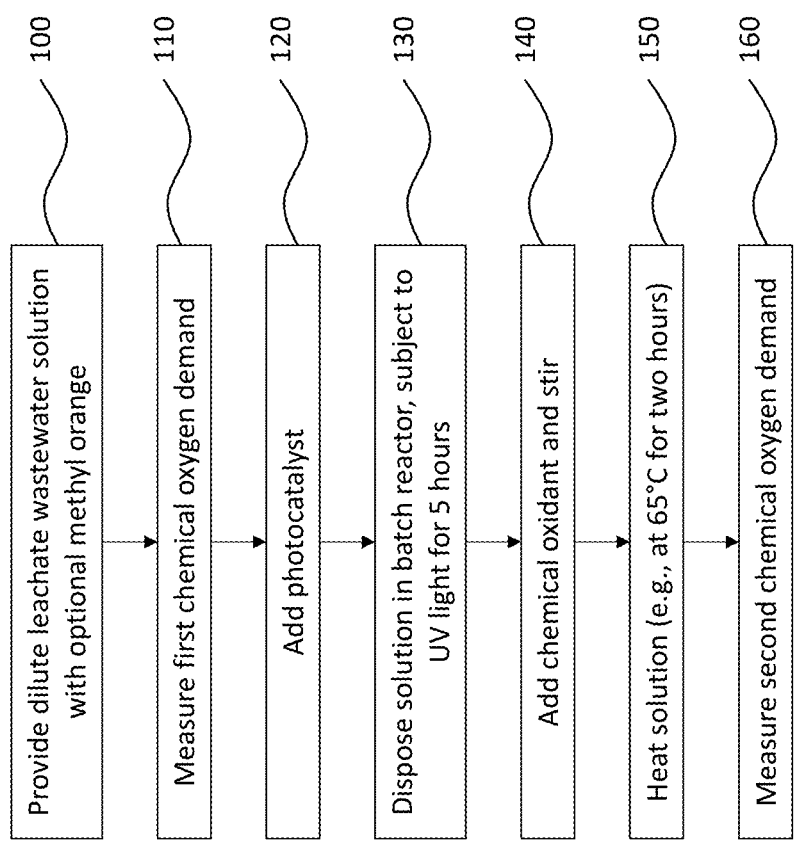
FIG. 13 depicts the flowchart of a sequential SCOPES methodology, in accordance with an embodiment of the present invention.

The flow chart involving leachate (and an optional methyl orange solution) remediation via SCOPES methodology and the sampling intervals for COD is shown in FIG. 13. As shown in FIG. 13, the method begins at step 100, during which a diluted leachate and/or wastewater solution is provided (and can optionally include methyl orange as a model contaminant). During step 110, a first chemical oxygen demand is measured, which is used as a baseline level during later calculation. During step 120, a photocatalyst, such as $TiO_2$, is added to the leachate solution, and during step 130, the photocatalyst and the leachate solution is added to a batch reactor and subjected to an ultraviolet light for approximately five hours (or between three and seven hours). A chemical oxidant, such as a mixture of sodium persulfate and hydrogen peroxide, is added to the leachate solution and photocatalyst during step 140, with the chemical oxidant being stirred into the solution. In an alternative embodiment, the chemical oxidant may be added to the leachate solution prior to the photocatalyst, such that the chemical oxidation reaction occurs prior to the photocatalytic oxidation reaction. At step 150, the entire solution is heated, for example to 65° C. for a period of approximately two hours; however, the period of time and the temperature may vary, such as heating for twenty-four hours and/or heating to approximately 90° C. During step 160, a second chemical oxygen demand is measured and compared to the first chemical oxygen demand to determine a level of remediation.

Figure 14:
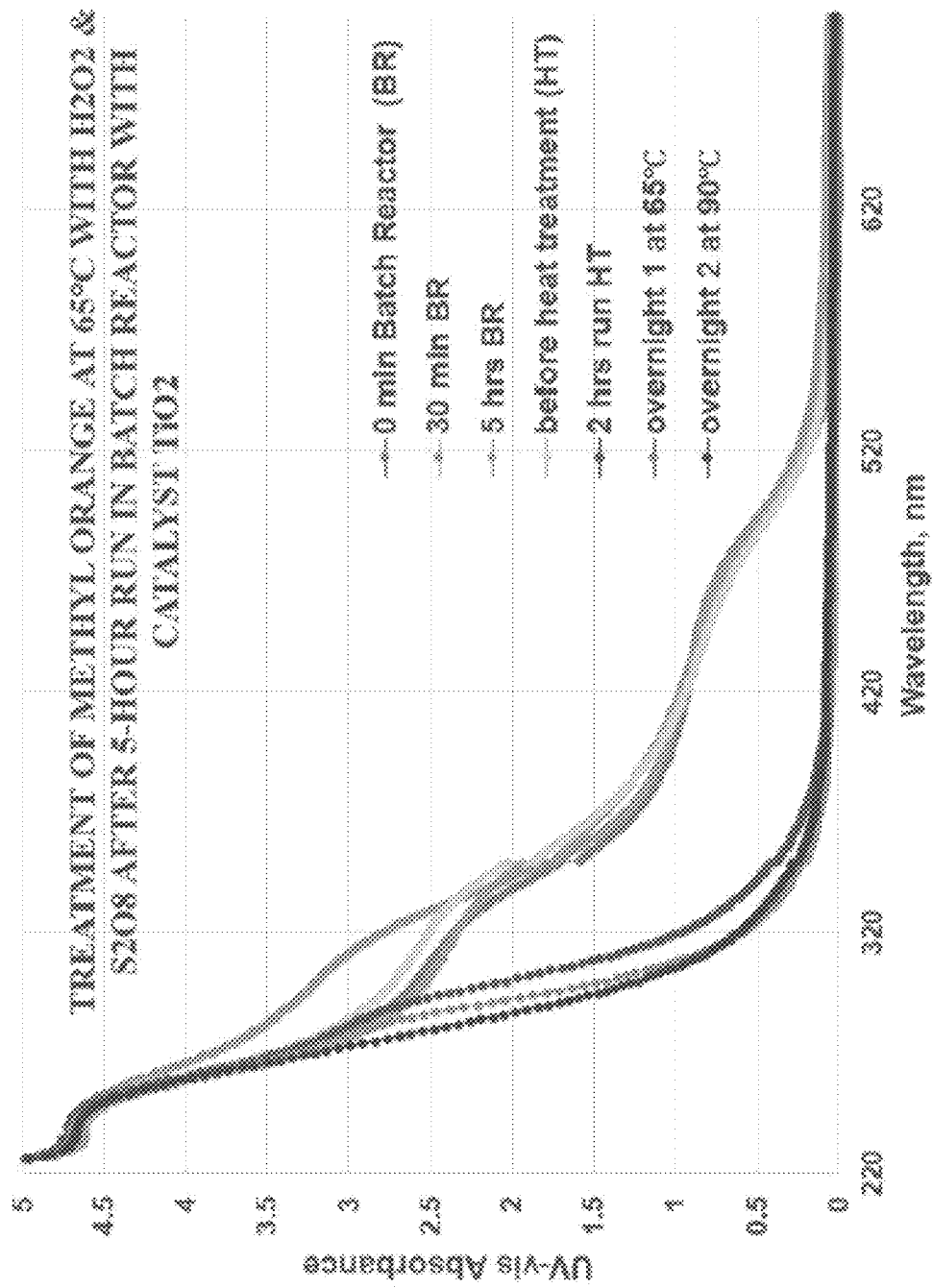
FIG. 14 depicts the UV-Vis absorbance of leachate loaded with methyl orange contaminants before and after subject to sequential SCOPES treatment. The methyl orange peak around 450 nm is completely degraded by the SCOPES.

FIG. 14 demonstrates the UV-Vis absorbance spectra of leachate with methyl orange before and after SCOPES remediation processes.

REFERENCES

[1] Williams, Paul T. Waste treatment and disposal. John Wiley & Sons, 2013.
[2] Renou, S., J. G. Givaudan, S. Poulain, F. Dirassouyan, and P. Moulin. "Landfill leachate treatment: Review and opportunity." Journal of Hazardous Materials 150, no. 3 (2008): 468-493.
[3] Jones-Lee, A., and F. Lee. "Landfill Post-Closure and Post-Closure Care Funding Overview of Issues." Waste Advantage Magazine (2014).
[4] http:/www.waste360.com/leachate/landfill-leachate-management-impacted-changes-wastewater-treatment-plants.
[5] Bolyard Stephanie C. "Evaluation of leachate dissolved organic nitrogen discharge effect on wastewater effluent quality". Waste Management, 65 (2017) 47-53.
[6] Kalčíková, Gabriela, Jana Zagorc-Končan, Marija Zupančič, and Andreja gajnar Gotvajn. "Variation of landfill leachate phytotoxicity due to landfill ageing." Journal of Chemical Technology and Biotechnology 87, no. 9. (2012): 1349-1353.
[7] Qi, Guangxia. Dongbei Yue, and Yongfeng Nie. "Characterization of humic substances in bio-treated municipal solid waste landfill leachate." Frontiers of Environmental Science & Engineering 6, no. 5 (2012): 711-716.
[8] Meeroff Daniel E., Lakner J., Coffman N., "Safe discharge of landfill leachate to the environment", Year 2 Final Report for the Hinkley Center for Solid and Hazardous Waste Management, Report #11073, July 2016.
[9] Huang. C. P., Dong, C., & Tang, Z. (1993). Advanced chemical oxidation: its present role and potential future in hazardous waste treatment. Waste management, 13(5-7), 361-377.
[10] Fujishima, A., & Honda, K. (1972). Electrochemical photolysis of water at a semiconductor electrode. nature. 238(5358), 37.
[11] Hilles, A. H., Amr, S. S. A., Hussein. R. A., El-Sebaie. O. D., & Arafa, A. I. (2016). Performance of combined sodium persulfate/$H_2O_2$ based advanced oxidation process in stabilized landfill leachate treatment. Journal of environmental management, 166, 493-498.
[12] Ball, R. G., & Moore, A. T. (2018). U.S. patent application Ser. No. 16/039,837.
[13] Zrinyi, N. (2017). Factors affecting contaminant transformation by heat-activated persulfate (Doctoral dissertation, Carleton University Ottawa).
[14] Asahi, R Y. O. J. I., Morikawa, T. A. K. E. S. H. I., Ohwaki, T., Aoki, K., & Taga, Y. (2001). Visible-light photocatalysis in nitrogen-doped titanium oxides. science, 293(5528), 269-271.
[15] Khan, S. U., Al-Shahry, M., & Ingler, W. B. (2002). Efficient photochemical water splitting by a chemically modified n-TiO2. science, 297(5590). 2243-2245.
[16] Pajonk. G. M. (1991). Aerogel catalysts. Applied Catalysis, 72(2). 217-266.
[7] Brus, L. E. (1983). A simple model for the ionization potential, electron affinity, and aqueous redox potentials of small semiconductor crystallites. The Journal of chemical physics, 79(11), 5566-5571.
[18] Ullah, S., Ferreira-Neto, E. P., Pasa, A. A., Alcântara, C. C., Acuna, J. J., Bilmes. S. A., . . . & Rodrigues-Filho, U. P. (2015). Enhanced photocatalytic properties of core@ shell $SiO_2@$ $TiO_2$ nanoparticles. Applied Catalysis B: Environmental, 179, 333-343.
[19] Kislov, N., Srinivasan, S. S., Emirov, Y., & Stefanakos, E. K. (2008). Optical absorption red and blue shifts in ZnFe2O4 nanoparticles. Materials Science and Engineering: B, 153(1-3), 70-77.
[20] Kang. K. H., Shin, H. S., & Park, H. (2002). Characterization of humic substances present in landfill leachates with different landfill ages and its implications. Water research, 36(16), 4023-4032.
[21] Lguirati, A., Baddi, G. A., El Mousadik, A., Gilard, V., Revel, J. C., & Hafidi, M. (2005). Analysis of humic acids from aerated and non-aerated urban landfill composts. International biodeterioration & biodegradation, 56(1), 8-16.
[22] Sierra, M. M. D., Giovanela, M., Parlanti, E., Esteves, V. I., Duarte, A. C., Fransozo, A., & Soriano-Sierra, E. J. (2005). Structural Description of Humic Substances from Subtropical Coastal Environments using Elemental Analysis, FT-IR and $^{13}$C-Solid State NMR Data. Journal of Coastal Research, 370-382.
[23] Smidt, E., & Meissl, K. (2007). The applicability of Fourier transform infrared (FT-IR) spectroscopy in waste management. Waste management, 27(2), 268-276.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A method of remediating leachate using a synergistic combination of advanced chemical oxidation and photocatalysis, the method comprising the steps of:
providing an amount of a leachate solution;
intermixing an amount of a photocatalyst with the leachate solution to form a leachate and photocatalyst solution;
adding the leachate and photocatalyst solution to a batch reactor, thereby enclosing the leachate and photocatalyst solution within the batch reactor and isolating the leachate and photocatalyst solution from an environment external to the batch reactor;
within the batch reactor, subjecting the leachate and photocatalyst solution to an ultraviolet-visible light source to form a photocatalyzed leachate solution;
intermixing a mixture of sodium persulfate and hydrogen peroxide to the photocatalyzed leachate solution; and
heating the mixture of sodium persulfate and hydrogen peroxide and the photocatalyzed leachate solution to remediate the photocatalyzed leachate solution into a remediated leachate solution,
wherein the steps of subjecting the leachate and photocatalyst solution to the ultraviolet-visible light source, intermixing the mixture of sodium persulfate and hydrogen peroxide to the photocatalyzed leachate solution, and heating the mixture of sodium persulfate and hydrogen peroxide and the photocatalyzed leachate solution synergistically remediate the photocatalyzed leachate solution by reducing a concentration of a contaminant within the remediated leachate solution, thereby reducing an ultraviolet absorbance associated with the remediated leachate solution, prior to dispensation of the remediated leachate solution to a reuse facility.

2. The method of claim 1, wherein an initial concentration of the leachate solution is diluted to include 14% by volume leachate.

3. The method of claim 1, further comprising a step of intermixing the contaminant to the leachate solution.

4. The method of claim 1, wherein the photocatalyst is titanium dioxide.

5. The method of claim 1, further comprising disposing the leachate and photocatalyst solution in the batch reactor for a period of approximately three to seven hours.

6. The method of claim 1, wherein the mixture of sodium persulfate and hydrogen peroxide the photocatalyzed leachate solution is heated within the batch reactor to a temperature of 65° C. for a period of two hours.

7. The method of claim 1, wherein the mixture of sodium persulfate and hydrogen peroxide and the photocatalyzed leachate solution is heated within the batch reactor to a temperature of 90° C. for a period of two hours.

8. The method of claim 1, wherein the mixture of sodium persulfate and hydrogen peroxide and the photocatalyzed leachate solution is heated within the batch reactor to a temperature of 65° C. for a period of twenty-four hours.

9. The method of claim 1, wherein the mixture of sodium persulfate and hydrogen peroxide and the photocatalyzed leachate solution is heated within the batch reactor to a temperature of 90° C. for a period of twenty-four hours.

10. The method of claim 1, further comprising a step of verifying a degree of leachate remediation by measuring a first chemical oxygen demand of the leachate and photocatalyst solution, measuring a second chemical oxygen demand of the mixture of sodium persulfate and hydrogen peroxide and the photocatalyzed leachate solution, and comparing the second chemical oxygen demand to the first chemical oxygen demand, wherein the second chemical oxygen demand being lower than the first chemical oxygen demand indicates leachate remediation.

11. A method of testing an amount of remediation of leachate using a synergistic combination of advanced chemical oxidation and photocatalysis, the method comprising the steps of:
providing an amount of a leachate solution including a concentration of a toxic organic compound;
intermixing an amount of titanium dioxide as a photocatalyst with the leachate solution to form a leachate, photocatalyst, and toxic organic compound solution;
measuring a first chemical oxygen demand of the leachate, photocatalyst, and toxic organic compound solution;
adding the leachate, photocatalyst, and toxic organic compound solution to a batch reactor, thereby enclosing the leachate, photocatalyst, and toxic organic compound solution within the batch reactor and isolating the leachate, photocatalyst, and toxic organic compound solution from an environment external to the batch reactor;
within the batch reactor, subjecting the leachate, photocatalyst, and toxic organic compound solution to an ultraviolet-visible light source to form a photocatalyzed leachate solution;
intermixing a mixture of sodium persulfate and hydrogen peroxide and the photocatalyzed leachate solution to remediate the photocatalyzed leachate solution into a remediated leachate solution;
measuring a second chemical oxygen demand of the mixture of sodium persulfate and hydrogen peroxide and the photocatalyzed leachate solution; and
comparing the second chemical oxygen demand to the first chemical oxygen demand,
wherein the steps of subjecting the leachate, photocatalyst, and toxic organic compound solution to the ultraviolet-visible light source, intermixing the mixture of sodium persulfate and hydrogen peroxide to the photocatalyzed leachate solution, and heating the mixture of sodium persulfate and hydrogen peroxide and the photocatalyzed leachate solution synergistically remediate the photocatalyzed leachate solution by reducing the concentration of the toxic organic compound within the remediated leachate solution, thereby reducing an ultraviolet absorbance associated with the remediated leachate solution, prior to a dispensation of the remediated leachate solution to a reuse facility, and
wherein the second chemical oxygen demand being lower than the first chemical oxygen demand indicates removal of an amount of the toxic organic compound, and thereby indicates leachate remediation.

12. The method of claim 11, wherein the mixture of sodium persulfate and hydrogen peroxide and the photocatalyzed leachate solution is heated to a temperature of 65° C. for a period of two hours.

13. The method of claim 11, further comprising disposing the leachate, photocatalyst, and toxic organic compound solution in the batch reactor including the ultraviolet-visible light for a period of approximately five hours.

14. A method of remediating leachate using a synergistic combination of advanced chemical oxidation and photocatalysis, the method comprising the steps of:
   providing an amount of wastewater solution that is diluted to include 14% by volume leachate;
   intermixing an amount of a photocatalyst selected from the group consisting of titanium dioxide and modified titanium dioxide with the wastewater solution to form a leachate and photocatalyst solution;
   disposing the leachate and photocatalyst solution in a batch reactor, thereby enclosing the leachate and photocatalyst solution within the batch reactor and isolating the leachate and photocatalyst solution from an environment external to the batch reactor, the batch reactor including an ultraviolet-visible light source;
   subjecting the leachate and photocatalyst solution to the ultraviolet-visible light source within the batch reactor for a period of approximately three to seven hours to form a photocatalyzed leachate solution;
   after subjecting the leachate solution to the ultraviolet-visible light source, intermixing an amount of a mixture of sodium persulfate and hydrogen peroxide to the photocatalyzed leachate solution; and
   heating the mixture of sodium persulfate and hydrogen peroxide and the photocatalyzed leachate solution to a temperature of 65° C. for a period of two hours to remediate the photocatalyzed leachate solution into a remediated wastewater solution,
   wherein the steps of subjecting the leachate and photocatalyst solution to the ultraviolet-visible light source, intermixing the amount of the mixture of sodium persulfate and hydrogen peroxide to the photocatalyzed leachate solution, and heating the mixture of sodium persulfate and hydrogen peroxide and the photocatalyzed leachate solution synergistically remediate within the remediated leachate solution, thereby reducing an ultraviolet absorbance associated with the remediated leachate solution, prior to dispensation of the remediated wastewater solution to a reuse facility.

* * * * *

UNITED STATES PATENT AND TRADEMARK OFFICE
CERTIFICATE OF CORRECTION

PATENT NO. : 11,192,805 B2
APPLICATION NO. : 16/425590
DATED : December 7, 2021
INVENTOR(S) : Sesha S. Srinivasan et al.

Page 1 of 1

It is certified that error appears in the above-identified patent and that said Letters Patent is hereby corrected as shown below:

In the Claims

Column 14, Claim 11, Lines 38-41 should read:
intermixing a mixture of sodium persulfate and hydrogen peroxide to the photocatalyzed leachate solution;
heating the mixture of sodium persulfate and hydrogen peroxide and the photocatalyzed leachate solution to remediate the photocatalyzed leachate solution into a remediated leachate solution;

Column 15, Claim 14, Line 8 should read:
providing an amount of a wastewater solution that is diluted Column 16, Claim 14, Line 16 should read:
lyzed leachate solution synergistically remediate the photocatalyzed leachate solution by reducing a concentration of a contaminant within Signed and Sealed this
Twenty-ninth Day of March, 2022

Drew Hirshfeld
*Performing the Functions and Duties of the
Under Secretary of Commerce for Intellectual Property and
Director of the United States Patent and Trademark Office*